July 16, 1963

L. C. ERICKSON 3,097,734

RECIPROCATING PLATE FEEDER

Filed March 28, 1958

INVENTOR
LEWIS C. ERICKSON
BY
Williamson, Schroeder, Adams & Palmatier
ATTORNEYS

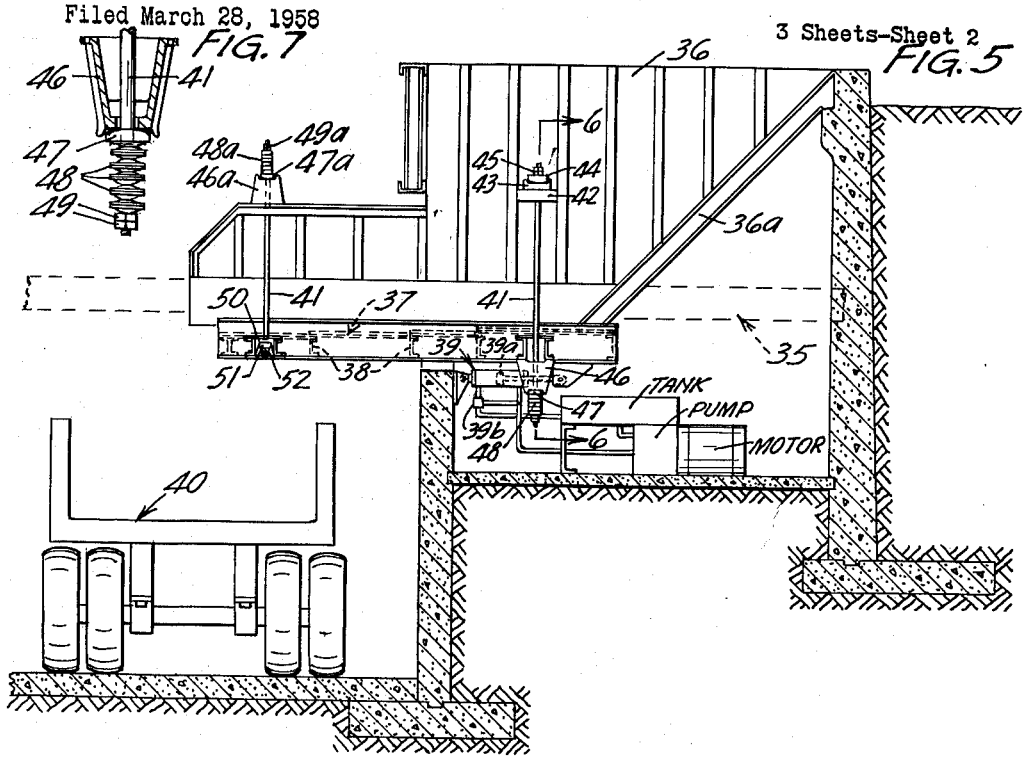
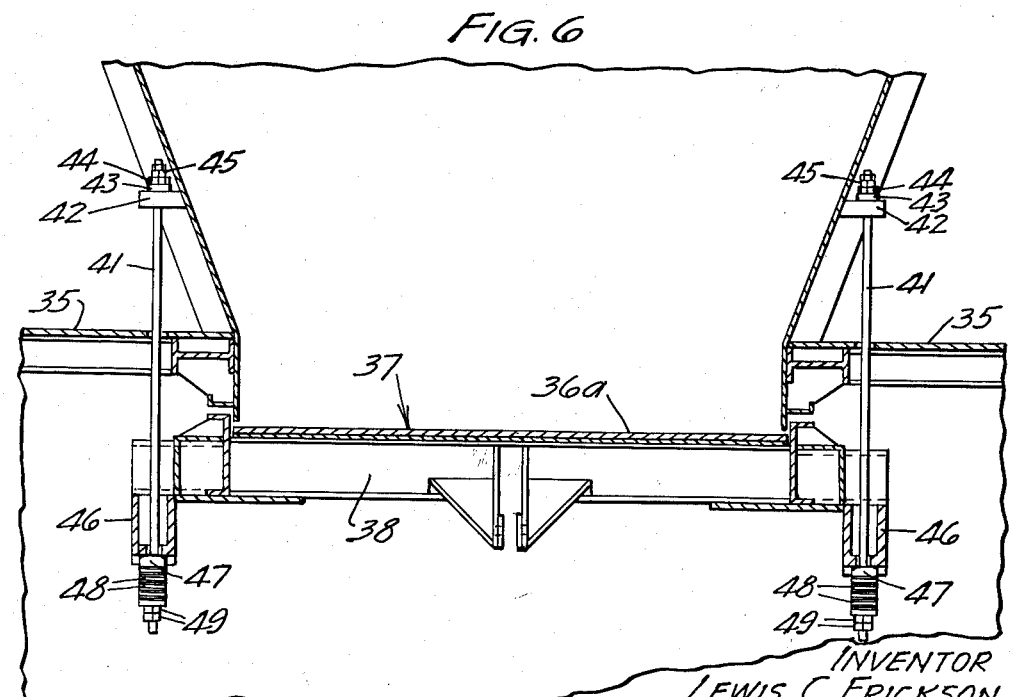

July 16, 1963
L. C. ERICKSON
3,097,734
RECIPROCATING PLATE FEEDER
Filed March 28, 1958
3 Sheets-Sheet 3
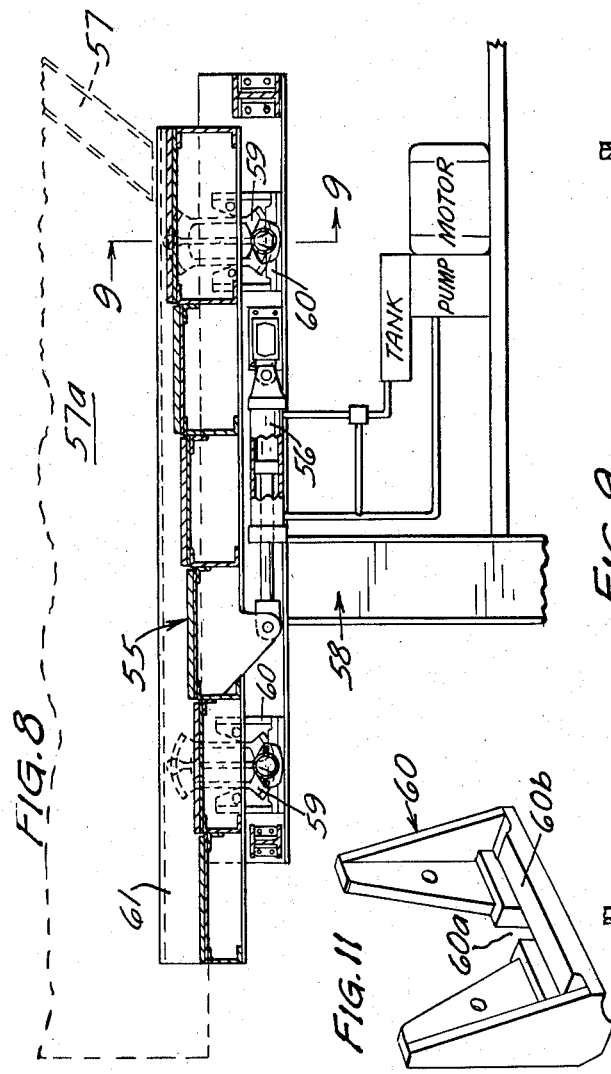
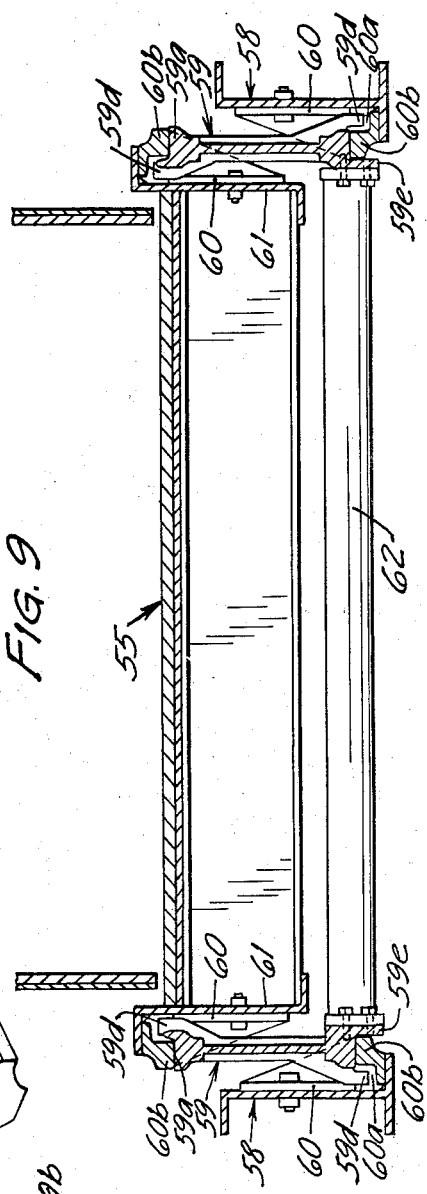
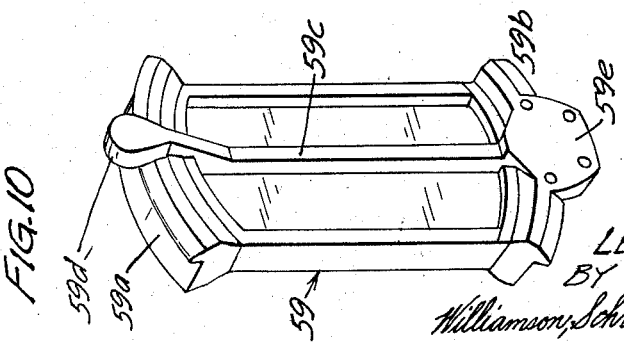
INVENTOR
LEWIS C. ERICKSON
BY
Williamson, Schroeder, Adams & Palmatier
ATTORNEYS United States Patent Office 3,097,734
Patented July 16, 1963

3,097,734
RECIPROCATING PLATE FEEDER
Lewis C. Erickson, Duluth, Minn., assignor to National Iron Company, Duluth, Minn., a corporation of Delaware
Filed Mar. 28, 1958, Ser. No. 724,567
5 Claims. (Cl. 198—53)

This invention relates to reciprocating plate feeders. More particularly, it relates to a novel means for supporting the plate of such a feeder while it reciprocates in effecting the feeding action.

Reciprocating plate feeders as heretofore known have had many disadvantages, some of which were of such magnitude that they were completely unsatisfactory for certain purposes. Such feeders conventionally have a plate or feeder deck mounted across the discharge of a hopper for reciprocating movement whereby the material discharged from the hopper will be fed uniformly onto a conveyor or into a truck or other receptacle. In such reciprocating plate feeders the reciprocating plate supports the material to be discharged from the hopper and effects the uniform feeding action by moving away from the discharge or laterally of the hopper a certain distance during one part of its reciprocating movement whereupon the material in the hopper will slide down behind the material formerly supported at the mouth or discharge of the hopper by the reciprocating plate. Thus when the reciprocating plate moves in the opposite direction back toward the hopper, the material at the outer end of the reciprocating plate is forced off the end of the plate as the latter is drawn back toward the hopper. In this manner, the material may be fed uniformly through the reciprocating action of the plate feeder which serves as a movable bottom for the hopper.

In reciprocating plate feeders, as heretofore known it has been conventional to support the reciprocating plate with rollers which are of relatively small diameter and are mounted for rotation about axles. The rollers ride on rails or tracks supported on the feeder or on the supporting frame for the feeder. Such a construction has numerous disadvantages which make them undesirable for use in reciprocating plate feeders and are entirely unsatisfactory for use in situations where the loads are heavy and the shocks are severe. A primary disadvantage in utilizing rollers is that they tend to wear rapidly because dirt accumulates on the rail or track and enters the bearings for the axles of the rollers and because there is a frictional wear caused by the dirt on the rail and relative slipping movement between the weight-bearing surfaces. Rollers have a distinct disadvantage in addition to their rapid wearing in that they must be lubricated frequently and must be frequently replaced and require constant maintenance. In addition, the rollers tend to stick and therefore cause substantial problems and loss of time and production. The small diameter rollers are unsatisfactory for heavy loading and jarring such as are present when heavy rocks or ore are deposited upon the feeder deck of such a construction. In such instances, the rocks often weigh several hundred pounds and sometimes even over one or two tons, and will drop a number of feet onto the plate feeder. This subjects the plate feeder to very severe abuse and it has been found that rollers are entirely unsatisfactory for this purpose. Rollers therefore, are practical for use only in situations where the loads and capacities are small. In addition, rollers require housings to prevent the entrance of dust and dirt insofar as is possible. It is difficult also to adjust the height or angle of inclination of the feeder deck when the plate is supported by rollers.

It has also been conventional in plate deck feeders to cause the plate to reciprocate through the use of eccentrics. An eccentric drive however, is impractical for situations requiring high torque such as is the case where the feeder deck is subjected to heavy loadings and moved at slow speeds. In such situations, the power requirements are extremely high if eccentrics are used and in some more extreme situations, the plate deck feeder cannot be driven by an eccentric of practical proportions. In instances of heavy loading, the plate deck feeder would require an extremely large eccentric which in turn would require large bushings so that the entire construction would be prohibitively expensive. My invention is designed to overcome each of the above difficulties.

My invention, three forms of which are disclosed herein, eliminate the above disadvantages by eliminating the use of rollers such as described above. I eliminate the use of rollers by substituting therefor support means which utilize rocker surfaces to prevent the wear attendant between weight-bearing surfaces of this means. As a result instead of high friction and consequent rapid wearing and all of its attendant disadvantages, my support means has substantially eliminated these problems and provided a relatively trouble-free uniform feeding device.

It is a general object of my invention to provide a novel and improved reciprocating plate feeder of simple and inexpensive construction and operation.

A more specific object is to provide a novel and improved reciprocating plate feeder which will operate in a more efficient and trouble-free manner and yet can be manufactured and serviced more inexpensively than similar plate feeders as heretoforeknown.

Another object is to provide a novel and improved reciprocating plate feeder which is capable of efficient and trouble-free operation at heavy load capacities with a minimum of servicing and expense.

Another object is to provide a novel feeder of the type described which is constructed so as to be self cleaning and require little if any lubrication.

Another object is to provide a novel and improved reciprocating plate feeder which can be operated at heavy load capacity for prolonged periods with little if any wear, servicing or maintenance.

Another object is to provide an improved reciprocating plate feeder which can be operated at heavy load capacities with a minimum of power requirements.

Another object is to provide a novel reciprocating plate feeder which can be operated at all load capacities with much less wear, maintenance, lubrication and expense than possible with reciprocating plate feeders as heretofore known.

Another object is to provide a novel and improved reciprocating plate feeder the parts of which need not be protected from dirt and which will function in a more satisfactory manner than those of reciprocating plate feeders as heretofore known.

These and other objects and advantages of my invention will more fully appear from the following description made in connection with the accompanying drawings wherein like reference characters refer to similar parts throughout the several views and in which:

FIG. 5 is a side elevational view of a second embodiment of my invention with the supports for the feeder shown in section;

FIG. 6 is a vertical sectional view taken along line 6—6 of FIG. 5.

FIG. 7 is a vertical sectional view of one of the rockers and cradles by means of which the supporting rods support the reciprocating feeder deck;

FIG. 8 is a side elevational view of a third embodiment of my invention with the adjacent side walls removed and with portions thereof broken away to better illustrate the construction;

FIG. 9 is a vertical sectional view taken along line 9—9 of FIG. 8;

FIG. 10 is a perspective view on an enlarged scale of one of the rockers by means of which the feeder deck is supported; and FIG. 11 is a perspective view on an enlarged scale of the keeper which prevents the rockers from creeping longitudinally of the feeder deck.

Figure 1:
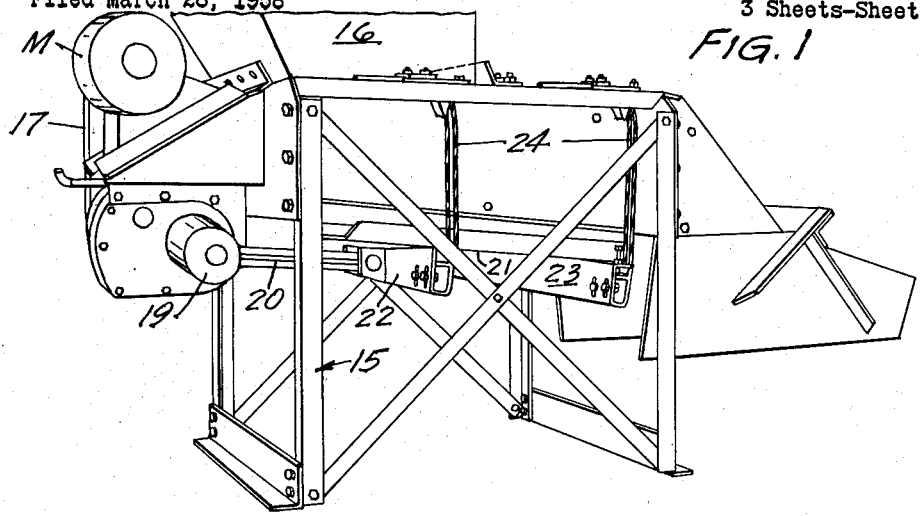
FIG. 1 is a perspective view of one form of my invention.
Figure 2:
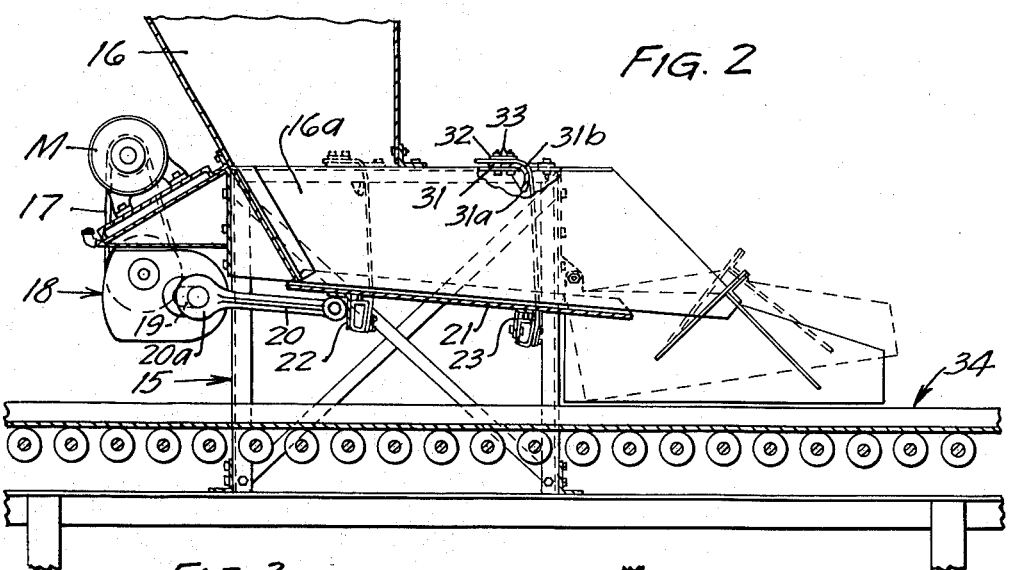
FIG. 2 is a side elevational view of the same.
Figures 3, 4:
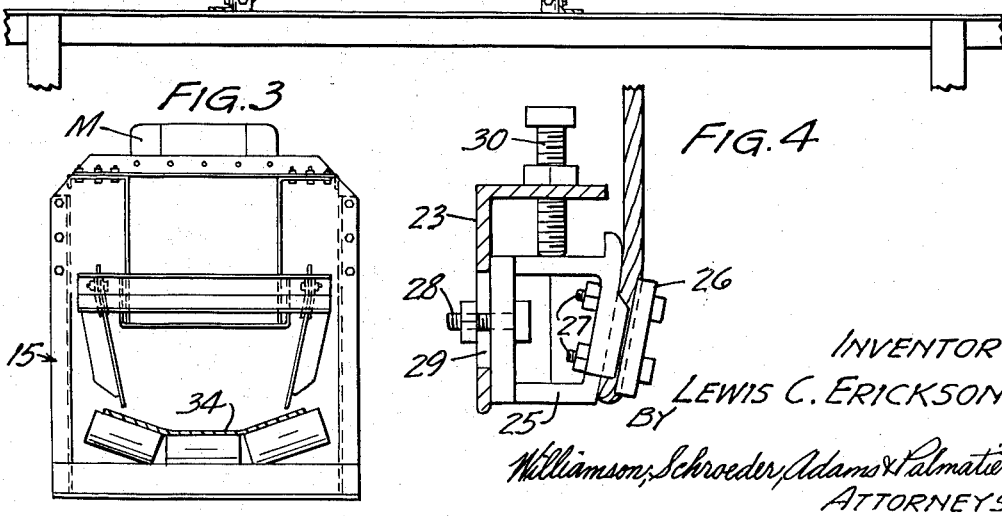
FIG. 3 is a front end elevational view of the same.
FIG. 4 is an elevational view on an enlarged scale of the anchoring means for the cables by means of which the latter is attached to the reciprocating plate feeder or feeder deck.

The first and simplest form of my invention is best illustrated in FIGS. 1–4 wherein there is shown a reciprocating plate feeder which is particularly well adapted for handling relatively small loads and capacities. As shown, this reciprocating plate feeder includes a frame 15 which supports a hopper 16 and also supports a motor M which drives by a belt 17, a gear reducer indicated generally as 18. This gear reducer 18 has a crank arm 19 which constitutes the output shaft thereof. This crank arm 19 is pivotally connected by a heavy bearing 20a to a rod 20 which in turn is pivotally connected to the rear portion of the reciprocating feeder deck 21. As best shown in FIGS. 1–2 this rod 20 is pivotally connected to one of the cross supports 22 and 23. As shown, the reciprocating plate or feeder deck 21 is supported at each of its sides by a pair of cables indicated by the numeral 24. Each of the cables 24 is looped at its lower end as best shown in FIG. 4 and anchored to an anchor bracket 25 by means of a clamping plate 26 and a pair of bolts 27 which pass through the bracket 25. The bracket 25 is adjustably mounted upon one of the cross supports 22 or 23 as the case may be and held in place as by a bolt 28 which extends through a veritcally elongated slot 29 formed in the cross supports. An adjustment bolt 30 extends downwardly from the upper leg of the U-shaped cross support as best shown in FIG. 4 to permit the feeder deck 21 to be adjusted vertically and to have its angle of inclination altered as desired.

The upper ends of each of the cables 24 are secured to the frame 15 by means of a rocker 31 and a clamping plate 32 and a pair of bolts 33. As best shown in FIG. 2, the rocker plate 31 has a depending portion 31a which has a curved weight supporting surface 31b about which the upper end portion of the cables 24 may rock. The portion of the cable 24 which bears against the curved rocking surface 31b is the other weight-bearing surface which cooperates with the curved surface 31b to support the weight of the reciprocating plate 21 as it is moved forwardly and backwardly by the rod 20. It will be noted that the curved rocking surface 31b has a relatively large radius and that there is no relative slipping movement between the cooperating weight-bearing surfaces of the rocker 31 and the cable 24. On the contrary, there is a mere relative rocking motion between these two surfaces which substantially eliminates frictional wear therebetween during the reciprocating movement of the plate or panel 21. The curvature of surface 31b insures that cables 24 will not bend at one point only and break because of fatigue at that point the large radius of curvature of surface 31b insures that the cable will flex within its normal bending capabilities.

It will be noted that the feeder deck 21 extends across the discharge 16a of the hopper 16 and extends laterally of the hopper so as to receive thereon the material discharged through the hopper and to control the flow of material therethrough. If the feeder deck 21 is allowed to remain motionless the material will cease to flow through the discharge 16a of the hopper while if it is reciprocating, it will cause the material to be fed uniformly off the outer end of the feed deck. FIG. 2 shows that the feeder deck extends laterally of the hopper and is in a position to receive the material therefrom.

In FIG. 2 the reciprocating plate feeder is shown in position to withdraw the material from the hopper 16 and deposit it at a uniform rate upon a conveyor indicated generally as 34. This particular embodiment of my invention completely eliminates the problems heretofore experienced in the use of rollers to support the reciprocating feeder deck as outlined hereinbefore. This particular construction requires a minimum of maintenance and care. It will be noted that the support for the feeder deck 21 does not involve use of rollers and therefore there is no need to replace the same when they become worn. Very little if any lubrication is required in this type of construction and the rocking surfaces 31b tend to clean themselves in that any dirt or foreign material which may fall between the curved surface 31b and the cable 24 will be crushed and will immediately free itself by falling out of that area. It will be noted also that it is a relatively easy matter to change the height of the feeder deck or to change its angle of inclination when desired. It will also be noted that the construction of this type of support for the reciprocating plate feeder is extremely inexpensive and simple to manufacture and operate.

The second embodiment of my invention is particularly well adapted for use in situations of heavy loading and capacities. For example, in the movement of iron ore and the like, extremely heavy loads must be conveyed and uniformly deposited upon conveyors or into trucks or other receptacles. In the movement of such relatively heavy materials it is common for the material to drop at least several feet and in view of the fact that the individual chunks may weigh several hundred pounds, the equipment which must handle this material must be able to withstand heavy jarring and unusually heavy loads. The embodiment shown in FIGS. 5–7 inclusive, can handle extremely heavy loads and capacities without excessive and prohibitive maintenance and replacement requirements. The embodiment shown includes a supporting frame indicated generally as 35 which supports a hopper 36 having a discharge opening 36a across which a reciprocating feeder deck 37 is mounted. The feeder deck 37 is supported by plurality of transversely extending cross supports such as 38 and is caused to reciprocate by means of a differential type cylinder indicated generally as 39. As best shown in FIG. 5, the piston 39a has opposed ends the area of one of which, as shown, is substantially twice the area of the other. The end of the piston 39a which has the smaller area is continuously connected to the pump as shown and the end of the piston having the larger area is alternately connected to the pump and to the reservoir by a valve 39b. When the valve 39b connects the cylinder to the reservoir it cuts off the flow from the pump to the end of the piston having the larger area and when this valve is opened to permit the fluid to flow from the pump to the end of the piston having the larger area, the valve cuts off any flow into the reservoir. By controlling the valve the feeder deck 37 may be caused to reciprocate forwardly and backwardly with a minimum of power requirements. As the feeder deck 37 moves forwardly, the material contained within the hopper or material containing and supplying means 36 slides downwardly along the inclined wall 36a and behind the material on the forward end of the feeder deck 37. When the feeder deck 37 is retracted by the cylinder 39, the material at the outer end of the feeder deck is caused to slide off the outer end and drop into the truck indicated by the numeral 40.

The feeder deck 37 is suspended in a slightly different manner in the embodiment shown in FIGS. 5–7, inclusive, but the same principle is utilized. The feeder deck 37 is supported at each side by a pair of supporting links or rods on suspension means 41. Each of these rods 41 is supported on the hopper 36 at its upper end in the manner shown. A bracket 42 is mounted upon the hopper 36 and supports a cradle member or upper support rod mounting element 43 having an upwardly directed weight-bearing surface which in turn supports a rocker member or weight-bearing element 44 having a downwardly directed weight-bearing surface through which the rods 41 pass. A nut 45 prevents the rod 41 from being drawn downwardly through the rocker member 44. The cradle 43 and the bracket 42 are each provided with elongated openings to permit the rods 41 to swing forwardly and backwardly with the feeder deck 37 which it supports.

The lower end of each of the rear supporting links 41 is secured to the feeder deck 37 in such a manner as to permit the feeder deck to reciprocate forwardly and backwardly while being supported by these rods. Each of the rods 41 extend downwardly through a cradle member or other support rod mounting element or means 46 having a downwardly directed weight-bearing surface and which is mounted upon a pair of the cross supports 38 and carries a rocker or weight-bearing element 47 having an upwardly directed weight-bearing surface, a plurality of Bellville springs 48 and a pair of nuts 49 which secure the rod to the feeder deck. The upper surface of the rocker 47 is convex in shape and has a relatively large radius of curvature and bears against the flat weight supporting surface of the cradle 46 just as the lower surface of the rocker 44 is convex in shape and bears against the flat upper surface of the cradle 43. The cradle 46 is provided with an elongated opening through which the rod 41 extends so as to permit the rod 41 to swing backwardly and forwardly as the feeder deck 37 reciprocates.

The rods 41 at the forward end of the feeder deck 37 are secured to the feeder deck and the hopper in a somewhat similar manner as are the rear supporting links 41 except that the Bellville springs are disposed at the upper end of the rod rather than at the lower end thereof. This can best be seen in FIG. 5 wherein the upper end of the rod is shown carrying an identical cradle member 46a and a rocker 47a and a plurality of Bellville springs 48a. At the extreme upper end there is a pair of nuts 49a. The lower surface of the rocker 47a is convex in shape and rocks upon the upper surface of the cradle 46a.

The lower end of each of the forward rods 41 is connected to the forward end of the feeder deck 37 as best shown in FIG. 6. Each of these rods carries at its lower end a cradle member 50, a rocker 51 and a pair of nuts 52. The upper surface of the rocker 51 is convex and rocks upon the lower surface of the cradle member 50. The cradle member 50 is provided with an elongated opening sufficiently long to permit the rod 41 to swing forwardly and rearwardly relative to the feeder deck 37.

It will be noted that the feeder deck 37 is indirectly supported by the frame 35 through the hopper 36. As the feeder deck 37 is caused to reciprocate, through the reversing action of the differential type cylinder 39 the weight of the load upon the feeder deck and the feeder deck itself is supported by the rods 41. The rockers 44, 47, 47a and 51 rock upon their supporting surfaces rather than slipping relative thereto, so that the frictional wear therebetween is reduced to a minimum. Since there is no relative slipping movement between the weight-bearing surfaces no lubrication is necessary. The rocking action which takes place between the rockers and the cradles is of such a nature that no lubrication is required. Moreover, these weight-bearing surfaces have a self cleaning tendency in that they quickly pulverize any dirt or rock or ore which may work itself between these surfaces and the powdered material will slip outwardly and clear of the weight-bearing surfaces. The Bellville springs are utilized to absorb the severe shock to which the feeder deck 37 is subjected when the extremely heavy chunks of ore or the like are permitted to drop a distance of several feet thereupon. These Bellville springs absorb the shock and prevent any damage to the construction which would otherwise be occasioned if the feeder deck 37 were supported by rollers mounted upon axles. Through the use of this construction, no damage is inflicted upon the feeder deck and its reciprocating mechanism despite prolonged use under most severe conditions of heavy loading, extreme jarring, and heavy capacities.

It should be noted that to adjust the volume of material caused to be fed by the reciprocating feeder deck 37 is only necessary to vary the volume of the hydraulic pump. It is also possible to vary the extent of reciprocating movement of the feeder deck 37 by varying the stroke of the piston, without changing the amount of material which is fed by the feeder deck, for as you shorten the stroke, the speed of the piston at a given hydraulic volume increases.

It will be noted that the feeder deck 37 illustrated in FIG. 6 is stepped. By utilizing this type of construction, the forward movement of the material through the discharge 36a of the hopper 36 can be facilitated, for the relatively large pieces of the material such as iron ore will be more positively engaged by the feeder deck as it moves forwardly.

The third embodiment of my invention is particularly well adapted for use in situations where extremely heavy loads must be carried. As best shown in FIG. 8 the reciprocating plate feeder or feeder deck 55 is stepped and is caused to reciprocate through the use of a differential type cylinder such as is disclosed and described with respect to the construction shown in FIG. 6. This cylinder 56 is pivotally connected to the reciprocating plate feeder 55 in driving relation. The feeder deck 55 extends across the discharge 57a of a hopper 57 which in turn is supported by a frame indicated generally by the numeral 58. The particular construction shown in FIGS. 8–11, inclusive, is somewhat different from that shown in the other two embodiments of my invention but the same principle is utilized in that a pair of rocking surfaces are utilized to bear the weight of the reciprocating feeder deck and its load. This is in sharp contrast to roller type reciprocating feeders wherein it is conventional to use rollers having axles and bearings therefor which are relatively small. Neither the axles nor the bearings in such feeders can withstand the shock and weight loads experienced in heavy-duty operation. Moreover, the cost of increasing the diameters of the bearings and axles to even approach a satisfactory handling of heavy loads, along with the space which would be required for the same, makes such a modification impractical from a standpoint of either cost or usability. In the embodiment shown in FIGS. 8–11 each of the corner portions of the reciprocating feeder deck 55 is supported by a rocker member indicated generally by the numeral 59 and best shown in FIG. 10. As shown, this rocker 59 has an upper rocking surface 59a and a lower rocking surface 59b. At each side of the rocker member 59 there is a web 59c which terminates at opposite ends in a lobe 59d. The lobe 59d, when the device is assembled extends into a keeper opening 60a of a keeper member 60. One of these keeper members is bolted to the frame 58 as best shown in FIG. 9 at each corner of the feeder deck 55. A second such keeper 60 is bolted in inverted position as best shown in FIG. 9 to a Z-bar 61 upon which the reciprocating plate feeder 55 is welded. The other lobe 59d which is at the top of the rocker 59 extends into the keeper opening 60a of this inverted keeper 60, the two lobes 59d cooperating to prevent the rocker 59 from creeping longitudinally of the feeder deck while the latter is reciprocating.

As best shown in FIG. 11 each of the keeper members 60 is provided with a rail portion 60b against which the rocker surfaces 59a or 59b as the case may be will bear. Thus as the reciprocating plate feeder is caused to move backwardly and forwardly by the cylinder 56, the rocking surfaces 59a and 59b will rock along the rail portion 60b of its associated keeper 60 and will together bear the weight of the plate deck feeder 55 and its load. A rigid tie member 62 extends between the lower portions of each pair of the oppositely disposed rockers 59 (as shown in FIG. 9) to provide rigidity for the structure. The tie member 62, as shown, is bolted at each of its ends to an attachment flange 59e of a rocker to preclude side-sway and tipping of the rockers 59.

I have found that the rockers 59 provide a very satisfactory solution in eliminating the disadvantages of using rollers to support such a feeder deck as it reciprocates. There is substantially no friction between the rocking surfaces 59a and 59b and their associated rail surface 60b. As a result there is no need for lubrication and there is very little consequential wear despite the fact that extremely heavy loads are imposed upon the feeder deck 55. The differential type cylinder provides more than adequate power to move the feeder deck 55 forwardly and backwardly and the rockers 59 provide more than adequate support for sustaining the feeder deck in elevated position. In view of the fact that there is so little friction involved, substantially less power is required to cause the feeder deck 55 to reciprocate as compared to what would be required if rollers were utilized to support the feeder deck. The big advantage however, lies in the fact that there is no relative slipping movement between the weight-bearing surfaces 59a and 59b and their associated rail surface 60b so that there is very little wear. By eliminating the substantial wear problem, I have eliminated substantially all of the disadvantages hereinbefore outlined as associated with roller supports for the reciprocating feeder decks. In addition, the construction shown herein is of extremely simple design and can be manufactured much more inexpensively than the type of construction wherein rollers are utilized to support the feeder deck. It should be noted also that an absolute minimum of maintenance and attention is required to the type of construction disclosed herein and that the weight-bearing surfaces tend to clean themselves while they are moving relative to each other without involving substantial wear upon the surfaces.

It will of course be understood that various changes may be made in the form, details, arrangement and proportions of the parts without departing from the scope of my invention.

What is claimed is:

1. In a withdrawal-type heavy-duty service reciprocating feed mechanism for use in feeding material comprising
   (a) material containing and supplying means,
   (b) a feeder deck means,
   (c) and suspension means for reciprocably supporting said feeder deck means beneath the discharge of said material containing and supplying means in position to receive and support such material thereon for ready discharge therefrom,
   (d) said suspension means being comprised of a plurality of substantially rigid support rods having upper and lower end portions,
   (e) at least two upper support rod mounting elements one of which is fixed adjacent each side of said discharge opening,
   (f) at least two other support rod mounting elements one each of which is carried by opposite sides of said feeder deck in substantial vertical alignment with said upper rod mounting elements,
   (g) each of said upper rod mounting elements having an upwardly directed weight-bearing surface,
   (h) each of said other support rod mounting elements carried by said feeder deck having a downwardly directed weight-bearing surface,
   (i) weight-bearing elements carried by the upper and lower end portion of each of said rods,
   (j) the weight-bearing elements carried by the upper end portion of each of said rods having a downwardly directed weight-bearing surface and the weight-bearing element carried by the lower end portion of each of said rods having an upwardly directed weight-bearing surface,
   (k) the weight-bearing surfaces of each of said rod mounting elements engaging and cooperating with one of said weight-bearing surfaces of one of said weight-bearing elements to support a portion of the weight of said feeder deck means and its load,
   (l) the end portions of each of said rods extending through an unrestricting passage in its respective support rod mounting elements,
   (m) one of said cooperating weight-bearing surfaces being substantially flat and the other being convex to provide a rocking movement between said surfaces to avoid friction and prevent said rods from flexing during reciprocation of said feeder deck, and
   (n) means on each of said end portions of each of said rods for maintaining said weight-bearing elements in operating position.

2. The structure defined in claim 1, wherein the weight-bearing surfaces of each of said weight-bearing elements is convex and the weight-bearing surface of each of said rod mounting elements is flat.

3. The structure defined in claim 1, wherein said material containing and supplying means is comprised of a hopper structure and said upper rod mounting elements are brackets fixed to and disposed at opposite sides of said hopper structure.

4. The structure defined in claim 1, and resilient means carried on end portions of each rod disposed between the weight-bearing element and its said means for maintaining the same in operative position.

5. The structure defined in claim 1, wherein the two rigid support rods and their mountings in operative relationship comprise a pair, and there being another pair of similar support rods similarly mounted with respect to said first pair in spaced relationship therewith.

References Cited in the file of this patent

UNITED STATES PATENTS

| | | |
|---|---|---|
| 522,779 | Carstens et al. | July 10, 1894 |
| 1,204,522 | Wall | Nov. 14, 1916 |
| 1,263,528 | Chabala | Apr. 23, 1918 |
| 1,890,135 | Stickel | Dec. 6, 1932 |
| 2,214,755 | Tafel | Sept. 17, 1940 |
| 2,389,566 | Thomas | Nov. 20, 1945 |
| 2,778,193 | Stockett | Jan. 22, 1957 |

FOREIGN PATENTS

| | | |
|---|---|---|
| 15,329 | Great Britain | 1910 |